Figure 1:
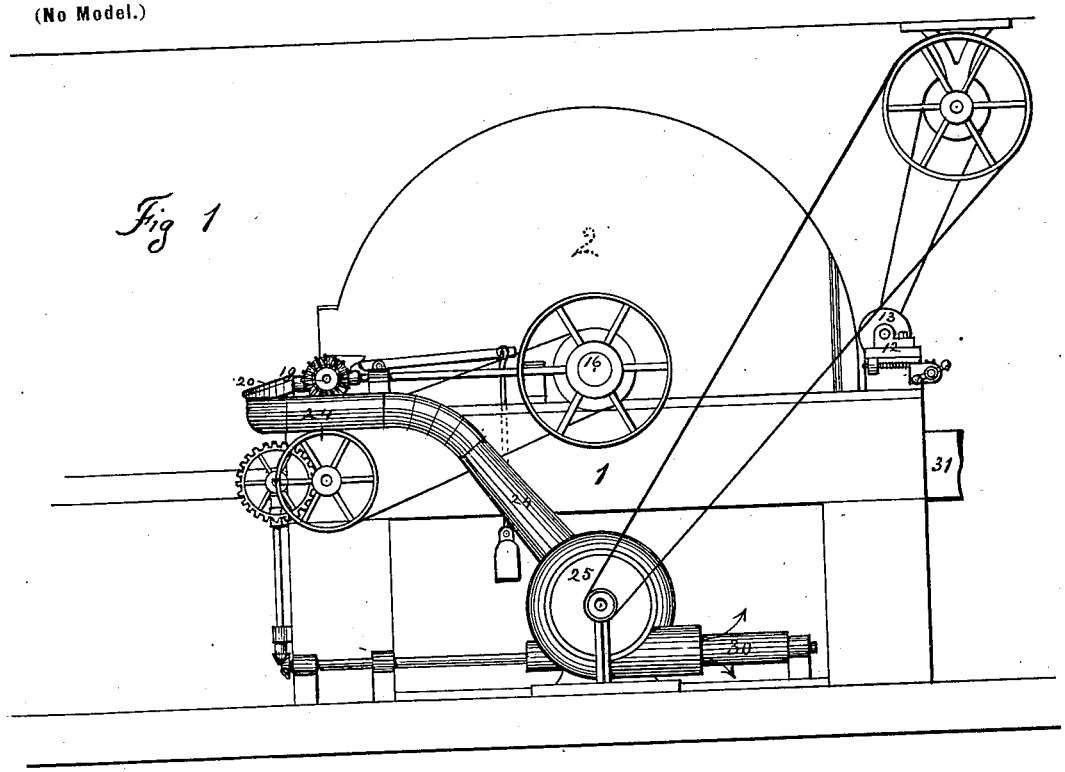

No. 674,520.  
C. E. SACKETT.  
MACHINE FOR CUTTING FUR FROM PELTS.  
(Application filed Aug. 11, 1900.)  
Patented May 21, 1901.

(No Model.)  
5 Sheets—Sheet 1.

WITNESSES  
Thos D. Torney  
William Downs

INVENTOR  
Chas. E. Sackett

No. 674,520. Patented May 21, 1901.
C. E. SACKETT.
MACHINE FOR CUTTING FUR FROM PELTS.
(Application filed Aug. 11, 1900.)
(No Model.) 5 Sheets—Sheet 2.
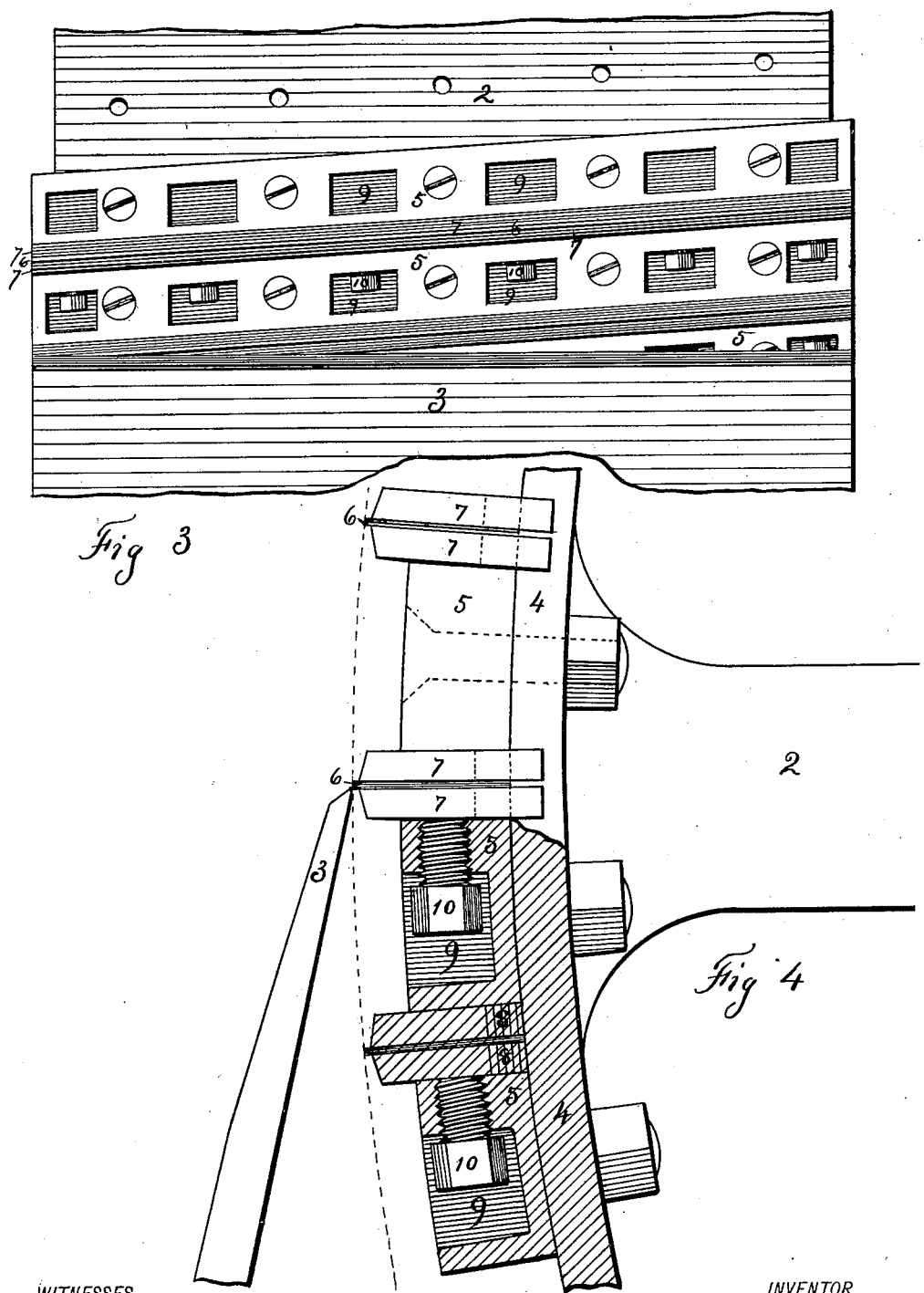
WITNESSES
INVENTOR No. 674,520.  
C. E. SACKETT.  
MACHINE FOR CUTTING FUR FROM PELTS.  
(Application filed Aug. 11, 1900.)  
(No Model.)  
Patented May 21, 1901.  
5 Sheets—Sheet 3.

WITNESSES  
Thos. D. Torrey  
William Downs

INVENTOR  
Chas. E. Sackett

No. 674,520. Patented May 21, 1901.
C. E. SACKETT.
MACHINE FOR CUTTING FUR FROM PELTS.
(Application filed Aug. 11, 1900.)
(No Model.) 5 Sheets—Sheet 4.
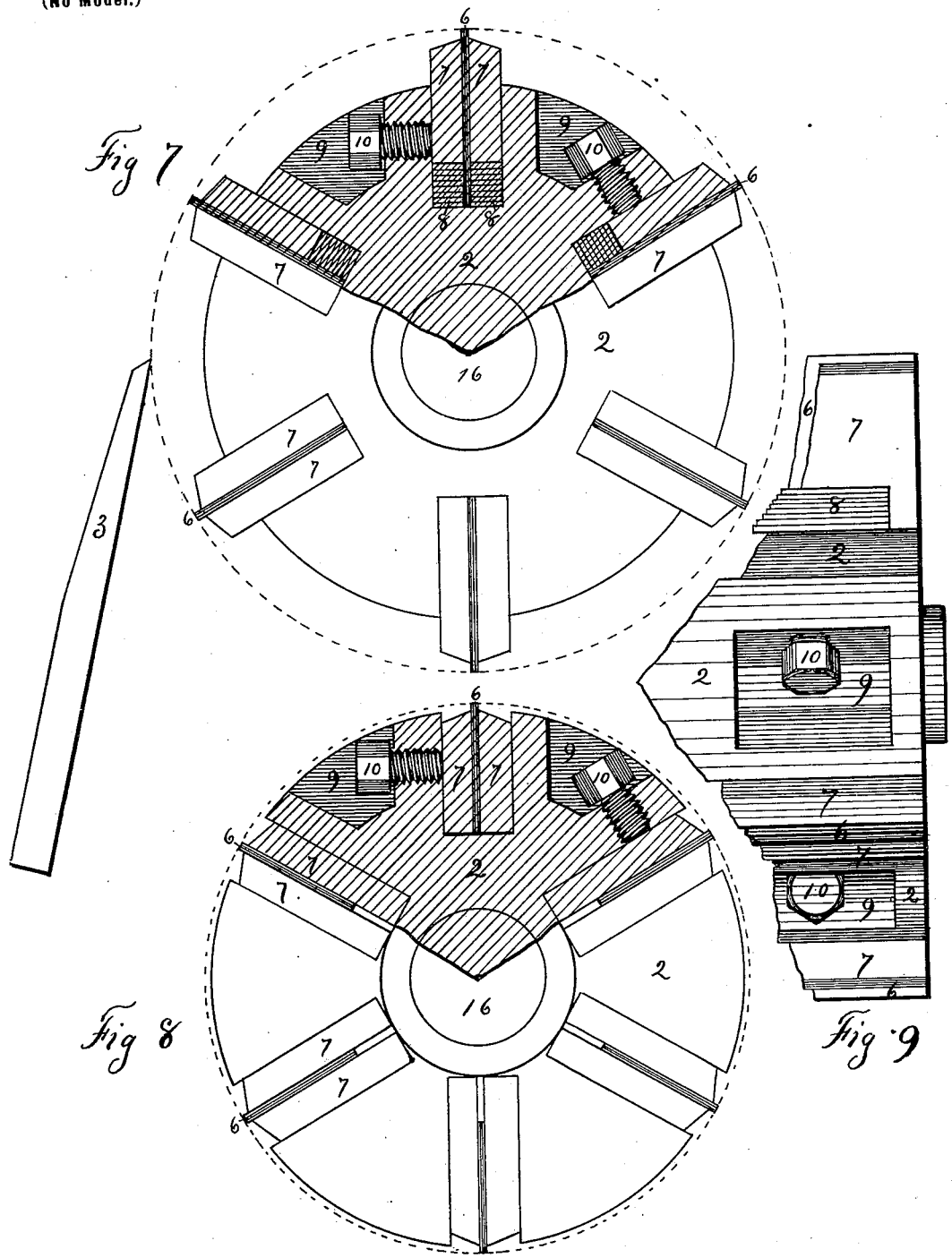
WITNESSES
INVENTOR No. 674,520. Patented May 21, 1901.
C. E. SACKETT.
MACHINE FOR CUTTING FUR FROM PELTS.
(Application filed Aug. 11, 1900.)
(No Model.) 5 Sheets—Sheet 5.
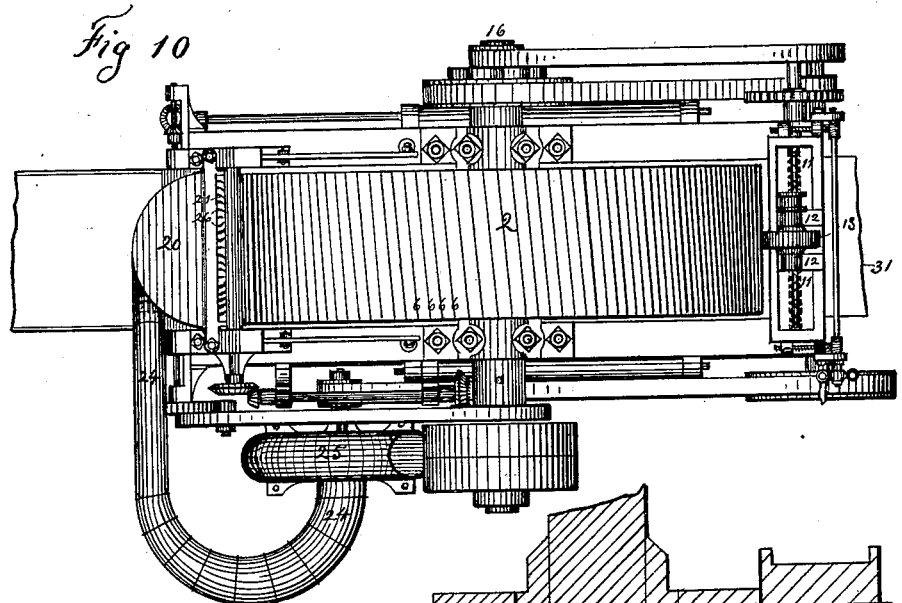
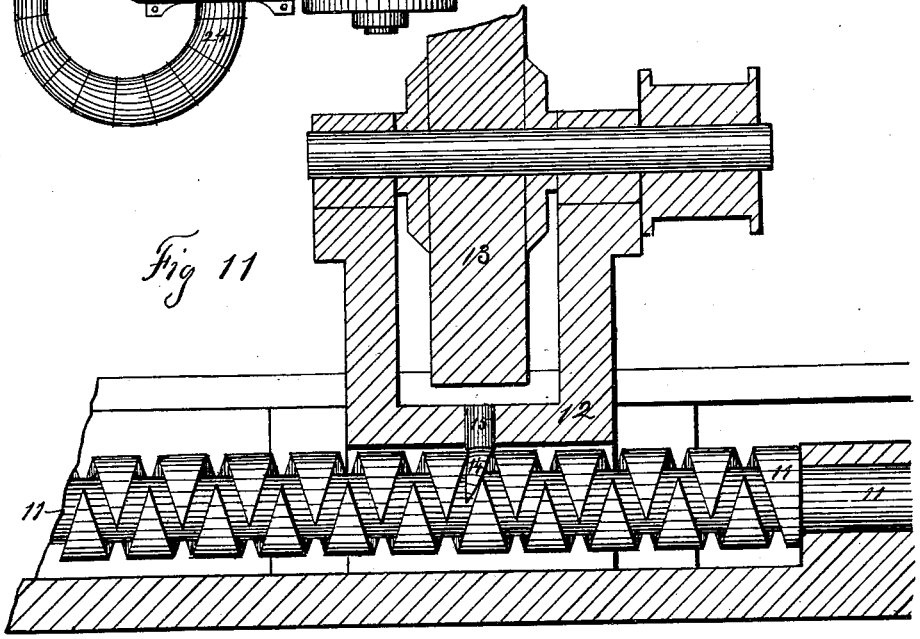
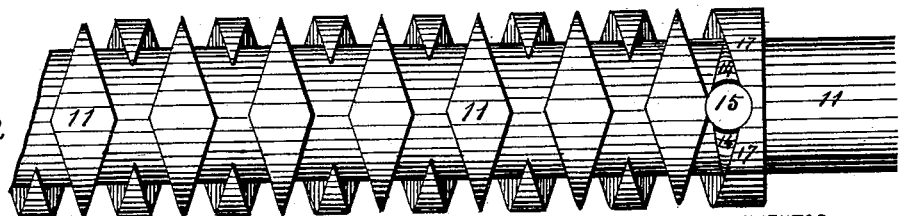
WITNESSES
INVENTOR
Chas E Sackett

UNITED STATES PATENT OFFICE.

CHARLES E. SACKETT, OF DANBURY, CONNECTICUT, ASSIGNOR TO THE NEW ENGLAND FUR CO., OF FALL RIVER, MASSACHUSETTS.

MACHINE FOR CUTTING FUR FROM PELTS.

SPECIFICATION forming part of Letters Patent No. 674,520, dated May 21, 1901.

Application filed August 11, 1900. Serial No. 26,645. (No model.)

*To all whom it may concern:*

Be it known that I, CHARLES E. SACKETT, a citizen of the United States, and a resident of Danbury, in the county of Fairfield and State of Connecticut, have invented a new and useful Improvement in Machines for Cutting Fur from Pelts, of which the following is a specification.

As now in general use these machines have rotary cylinders from three to six inches in diameter, upon which removable cutting-knives are adjustably bedded to contact with a stationary bed-knife in a shearing cut. The knives as a rule are screwed to the cylinders with a given wearing projection, which is very limited. In order to make it as great as possible, the knives are made very heavy. These knives are unscrewed every day to be ground, in most cases separately by hand. In others the cylinders are removed from their bearings and taken to a separate grinding-machine. As soon as the working projection is worn or ground away the knives must be replaced by a new set. The pelt is fed to the knives through a pair of corrugated feed-rolls, fur side down. The knives shear the pelt into thin strips, thereby releasing the fur at its roots. The cut pelt falls within the machine. The parted fur comes down a slide without the machine in an intact fleece.

Cylinders of the above description are run at very high velocity. The knives are quickly blunted by their swift rotation, and therefore must be ground and reset every day. As they are ground by hand, their edges seldom line with the bed-knife on being reseated, and great pressure is used to bring the edges into line, which results in loss of edge, great wear, friction, and other evils.

The object of this invention is very similar to that of an application for Letters Patent now pending, filed by me on the 27th day of April, 1900, Serial No. 14,598, for a machine designed to produce the same results, but of different construction. These differences are the subject of the present application. In both cases one principal aim is by increasing the number of knives in a cylinder circumference to cut the same number of skins per day with a far less number of cylinder revolutions and less cuts per knife, or as the ordinary cylinder has six knives and runs fifteen hundred revolutions per minute my cylinder has ninety-six knives and runs one hundred and twenty revolutions per minute. The cuts per minute are increased twenty-five per cent., the friction is reduced twelve hundred per cent., and the wear of the knives is increased sixteen times. Sharpening need be done but once in sixteen days instead of daily. A change of knives would only be required about twice a year instead of twice a month, and then the waste of knives by my system is seventy-five per cent. less than by the present system.

In my previous application I brought about the above results by means of a cylinder of large permanent diameter having knife-backing plates secured in recesses in its periphery, also at a fixed permanent cylindrical diameter, and knives backed by said plates sliding in said recesses, which were fed out as wear took place always to the same fixed standard cylindrical diameter.

In this application I still use a cylinder of large diameter and maintain the same proportions of knives to revolutions; but I have found it advisable to give my knives a permanent backing against the cylinder itself throughout their length and to allow their cutting edges to have a given wearing projection. When worn away, the knives must be changed, according to the usual custom. The customary knife maintains this working projection by having a heavy iron backing-plate welded to a thin steel plate. As the steel cutting edge wears the heavy iron backing is ground away, so as always to leave the steel plate in projection. This style of knife is costly, troublesome, and unsuited to my invention. As in application Serial No. 14,598, I adopt the parted knife there described and adapt my mechanism to its use. The present application also covers other improvements, which I will now describe in detail and which are clearly shown in the following drawings, which form part of this specification.

Figure 2:
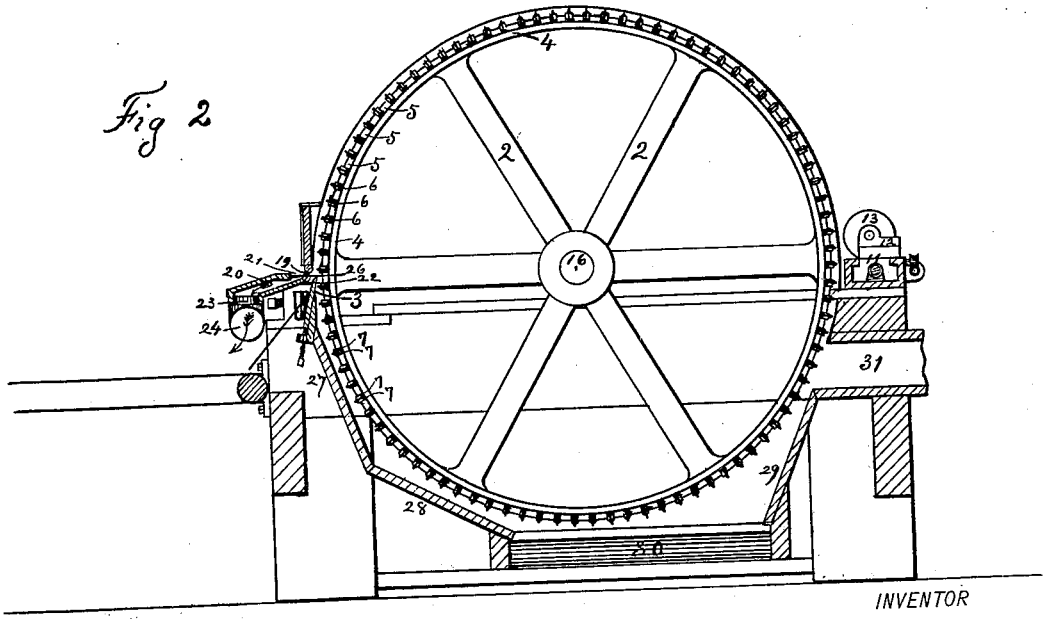
Figure 5:
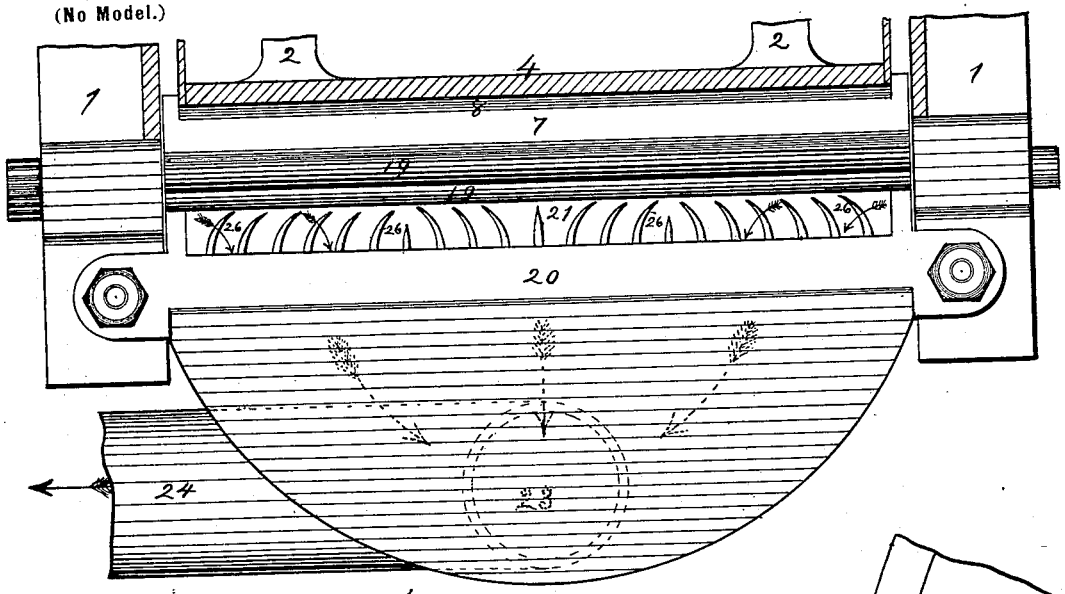
Figure 6:
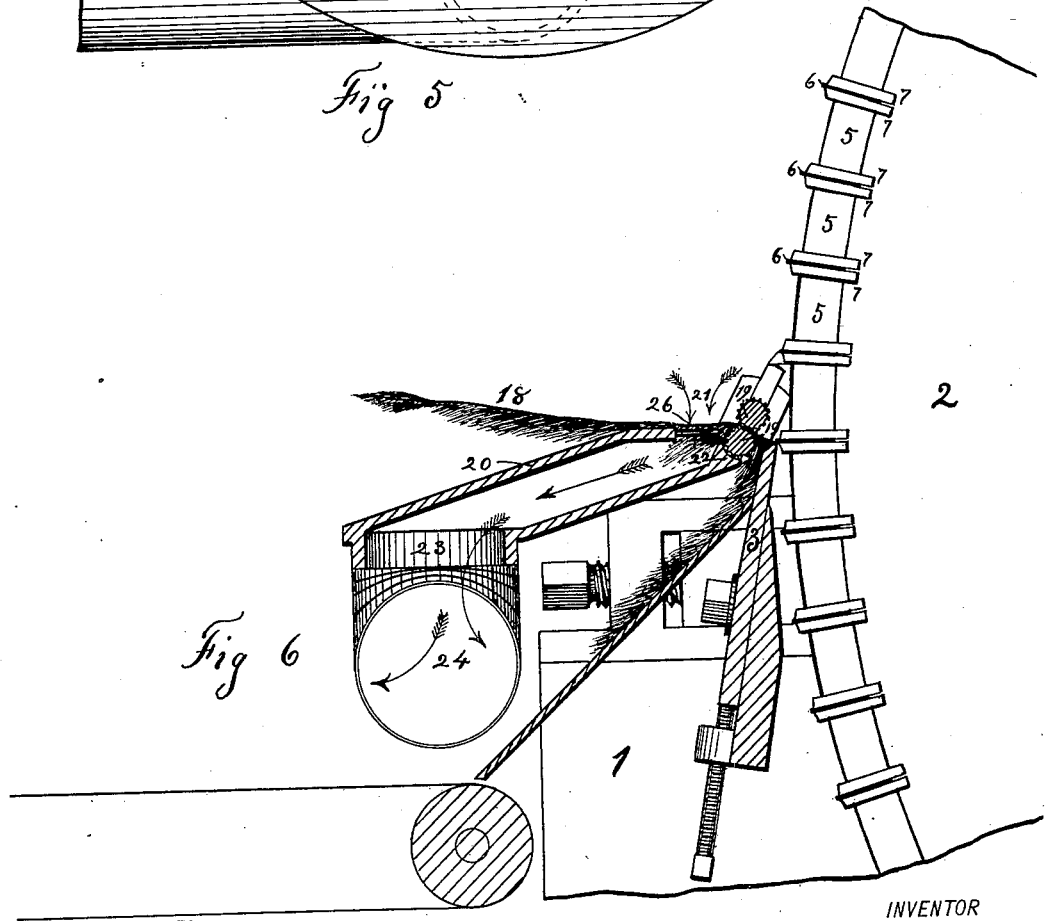

Figure 1 is a side elevation of a complete machine. Fig. 2 is a longitudinal cross-section. Fig. 3 is an enlarged detail face view of the cylinder construction. Fig. 4 is a side view of the same in elevation and partly in section. Fig. 5 is a plan view of the improved feeding-table. Fig. 6 is a cross-section through the same. Fig. 7 shows my improved contracting cylinder as applied to the small cylinders in general use at its maximum diameter in end elevation and section. Fig. 8 shows the same contracted to its minimum diameter. Fig. 9 is a sectional elevation of one end of the same. Fig. 10 is a general plan view showing the automatic grinding mechanism. Fig. 11 is an enlarged detail view of a section of the traverse-carriage carrying the grinding-wheel and the automatic screw movement. Fig. 12 is a full-sized top view of the screw and its traveling pin, showing how the movement is automatically reversible.

In the drawings and specification like figures relate to like parts.

1 is the machine-bed frame; 2, the cylinder bedded thereon; 3, the bed-knife.

4 is the rim of the cylinder, which in Figs. 1 to 6 forms the periphery of a large well-balanced wheel, preferably double-spoked to prevent any vibration.

5 is a series of metal lags permanently bolted to the cylinder-rim. They are curved on their under sides to match its circumference, are spaced at uniform distances apart, preferably spirally across the cylinder, and have smooth parallel sides forming bearing-walls. They are planed or turned on their outer face to a true cylindrical diameter and when bolted to the rim form a solid well-balanced cylinder practically of one piece. In the recesses formed by the parallel walls of these lags (see Fig. 4) a knife-plate 6 is inserted. It is made of a thin plate of hard-tempered steel or any other good cutting material, is of uniform thickness, smooth, and without any perforations. Its entire length should rest on the bottom of the recesses which form its support or backing. On each side of this knife are placed parallel supporting-plates 7 7, which accurately fill up the space between it and the bearing-walls. Their outer faces are beveled and have the same projection as the knife beyond the cylinder-recesses less a slight allowance for cutting clearance and wear of the knife. A space is left below them within the recesses just equal to the total working projection of the knife. This space is preferably, but not necessarily, filled with a tier of thin metal strips 8, each about one-sixteenth of an inch thick. When the knife is worn down to the side plates, one of these strips is removed and the side plates are contracted uniformly to the next strip. The strip simply serves as a convenient stop. A measuring-gage intelligently applied outwardly would be equally as effective. In Figs. 7 to 9 I show this novel construction of a contracting cutting-cylinder as applied to the ordinary small six-knife cylinder in general use. I conform to established usage by having the back edge of my knife permanently supported by the cylinder and by giving it a fixed working projection which is allowed to wear and be ground away; but here the similarity ceases. I use a thin smooth non-removable knife without perforations, that keeps its place until worn out, and to support it I use thick clamping-plates each side, which as wear of the knife takes place are contracted within the cylinder, as is clearly shown in Fig. 8, by the removal of the strips 8. (Shown in Fig. 7.)

The metal lags 5 have other recesses 9 spaced in their outer surfaces at short distances apart. These recesses are tapped in one side for set-screws 10, which pass through the bearing-walls and bear upon the side plates and knife, thus taking up the imperceptible space necessary for their sliding movement and pressing them solidly against the opposite bearing-wall. These screws do not have to sustain the blow or back pressure of the cut, as in application Serial No. 14,598. In this case the back edge of the knife has a permanent bearing against the solid cylinder. In ordinary practice the cylinder-knives are daily removed to be ground separately by hand, or the whole cylinder is removed from its bearings to a separate grinding-machine. This entails much loss of time and labor.

In this invention the cylinder-knives are never removed; but a grinding mechanism is constructed as a part of the machine which grinds the knives accurately in true parallel relation to the cylinder-bearings and the stationary bed-knife while the cylinder is in motion. This mechanism has been described and claimed in application Serial No. 14,598. In this invention I have improved upon it by making the traverse of the emery grinding-wheel across the knives automatic in its movements. This improvement (see Figs. 10 to 12) consists in making the screw 11, which actuates the traverse-carriage 12, carrying the emery-wheel 13, a right-and-left screw, the threads crossing each other. Inserted in the threads is a yoke 14, surrounding about half of the diameter of the screw. The yoke carries a pin 15, which is pivoted in the traverse-carriage. As the yoke reaches either end of the screw it is guided by the end circle 17 into the returning thread (see Fig. 12) and so keeps up an endless back-and-forth movement of the carriage without attention. The screw is driven from the main cylinder-shaft 16 through proper reducing mechanism to give it the proper speed, as is clearly shown in Fig. 10. This automatic grinding mechanism is adapted to grind the cylinder-knives either in motion or at rest; but I prefer the former as much more likely to produce true circumferential results.

The pelt 18 as fed to the cutting mechanism is passed through feed-rolls 19 19, arranged in front of the contacting knives. In application Serial No. 14,598 I show a feeding-table arranged in front of these feed-rolls having recesses in its surface and an apparatus arranged above the table for directing a current of air upon the edge fur to turn it beneath the pelt. In this invention I have improved upon that arrangement by making the feeding-table 20 hollow, by leaving an open space 21 in its top surface just in front of the feed-rolls, by making a seal 22 between its bottom surface and the lower feed-roll, and by leaving an outlet-opening 23 in its bottom, communicating by a pipe 24 with an exhaust-fan 25, which creates a strong air-current through said hollow table. The open space 21 is crossed by suitable fingers 26, preferably of round steel, pointed and inserted in the front edge of the table level with its top. They are preferably curved, as shown, to accommodate wide and narrow skins and extend as near to the feed-rolls as possible without touching them. As the pelt is drawn through the rolls, its fur side down, these fingers support it across the open space. The exhaust-fan creates a suction which holds the pelt firmly down to the fingers, and a stiff air-current is generated through the side open spaces, which sucks all the edge fur down between the fingers. The forward movement of the pelt acts to fold the edge fur beneath it by means of the hooked fingers and to hold it there until the feed-rolls grip both fur and pelt, and the edge fur is saved from the action of the knives, which wherever it extends beyond the pelt chop it into bits.

The pelt as cut into shreds falls within the machine more or less mixed with waste fur, according to the condition of the skins and the economy of cutting adjustment. It is part of my invention to separate these pelt-shreds and waste fur automatically. In application Serial No. 14,598 I show an arrangement whereby this is accomplished. In this invention I have improved upon it by surrounding the lower portion of the cylinder (see Fig. 2) with three fixed sections 27 28 29, the former two for the purpose of retaining the pelt and fur within the action of the wind-current generated by the revolving knives for a considerable space and which allows of using a straighter section as an uptake against which the pelt and fur are dashed by the air and the knives in a winnowing process, which allows the heavy material to slide down the uptake and be carried off by the traveling apron 30, while the light fur is carried over the uptake and through the orifice 31 into any convenient receptacle. These sections, which, with the traveling apron, practically box in the lower half of the cylinder, are adjusted in construction at such distances from the cylinder-periphery as will give the best separating results, according to the cylinder diameter, speed, and air-current generated, and are then fixed. They are easily readjusted and refixed at any different angle at any time of stoppage.

Having thus described my invention, what I desire to claim and secure by Letters Patent is—

1. In combination, a cutting-cylinder composed of a central shaft, a permanent cylindrical portion surrounding said shaft recessed lengthwise to form depressions having parallel bearing-walls, knife-blades inserted in said recesses, having back edges bearing permanently along their bottom and front edges projecting beyond their side walls, parallel plates arranged on each side of said knife-blades to support their cutting edges, accurately filling the spaces between them and the bearing-walls, said supporting-plates forming an outer cylindrical periphery adjustable to the wear of the knives by withdrawing them within the recesses, substantially as described and shown.

2. In a cutting-cylinder having recesses arranged in its periphery with parallel side walls, smooth knife-blades without perforations inserted in said recesses permanently supported by their floor, smooth supporting-plates arranged each side of said knives between them and the bearing-walls, means for withdrawing or advancing said supporting-plates to or from the bottom of said recesses, and means for securing them in position substantially as described and shown.

3. In a cutting-cylinder having recesses arranged in its periphery forming smooth parallel bearing-walls, other recesses arranged between them having screw-holes tapped in their sides to receive set-screws penetrating said bearing-walls, permanent knife-blades and adjustable supporting-plates filling said recesses from wall to wall upon which said set-screws bear to secure them in position, substantially as described and shown.

4. In a cutting-cylinder having recesses arranged in its periphery forming parallel side walls, the combination of knife-blades inserted in said recesses having their back edges permanently resting on the floor of said recesses, and their front edges projected beyond the recess side walls, side supporting-plates extending beyond the cylinder-recesses nearly to the knife-edges, and arranged to be withdrawn into the recesses as wear of the knife-blades takes place substantially as described and shown.

5. In a cutting-cylinder the combination with recesses arranged lengthwise of its periphery, of knife-blades permanently locked within said recesses, and parallel supporting-plates adjustable in or out of said recesses, of a series of parallel strips of uniform thickness placed below said supporting-plates removable a strip at a time as the plates are withdrawn to meet the wear of the knives, substantially as described and shown.

6. In a machine for cutting fur from the pelt, the combination of a bed-frame, a bed-knife, a cutting-cylinder provided with stationary knives and adjustable supporting-plates arranged about its periphery to contact with the bed-knife substantially as described and shown.

7. In a machine for cutting fur from the pelt the combination of a bed-frame, a bed-knife, a cylinder mounted on the frame, stationary knives arranged about its periphery, and adjustable supporting-plates arranged to be withdrawn into the cylinder commensurate with the wear of the knife substantially as described and shown.

8. In a machine for cutting fur from the pelt the combination of a bed-frame, a bed-knife, a cylinder mounted on the frame, stationary cylinder-knives, and a revolving emery-wheel for grinding the knives traversing them while in motion in true parallel relation to the cylinder-bearings and the contacting bed-knife substantially as described and shown.

9. In a machine for cutting fur from the pelt the combination with the cutting mechanism of an automatic grinding mechanism consisting of a traverse-carriage carrying a revolving emery-wheel, a revolving screw having right and left threads crossing each other, and a yoke traveling in said screw-threads, and pivoted in said traverse-carriage for the purpose set forth substantially as described and shown.

10. In a machine for cutting fur from the pelt the combination of a bed-frame, a bed-knife, a cutting-cylinder mounted on the frame, feed-rolls conveying the pelt to the knives, a hollow table arranged before said rolls over which the pelt passes, and an exhaust for communicating with the table, substantially as described and shown.

11. In a machine for cutting fur from the pelt the combination with the cutting mechanism and feeding-rolls of a hollow table having an open space in its surface between its forward edge and the feed-rolls as an air-inlet, an air seal between its lower surface and the lower feed-roll, an outlet forming an air-passage to a communicating exhaust-fan and an exhaust-fan generating an air-current through said hollow table and passages substantially as described and shown.

12. In a machine for cutting fur from the pelt the combination with the cutting mechanism and feed-rolls of a hollow table having an open space between its upper forward edge and the feed-rolls, fingers projecting from said edge and crossing said open space to support the pelt, an exhaust-fan generating an air-current through said hollow table which sucks the edge fur down between the fingers, said fingers being adapted to aid in turning the edge fur beneath the pelt as it advances across them, substantially as described and shown.

13. In a machine for cutting fur from the pelt provided with a cylinder having knives projecting from its periphery generating a wind-current, and a receptacle for its waste cuttings surrounding its lower half, the combination of a descending slide arranged to hold the cuttings within the action of the wind-current, the traveling apron and air-ascending slide operating together to separate the fur and pelt substantially as described and shown.

14. In a machine for cutting fur from the pelt provided with a cutting-cylinder generating a wind-current, and feed-rolls for feeding the pelts to the cylinder-knives, the combination of a feeding-table abutting against the lower feed-roll, and arranged as an air seal between the wind from the cylinder escaping above the roll, and the outcoming fleece of fur below the roll substantially as described and shown.

In testimony whereof I have signed my name to this specification in presence of two subscribing witnesses.

CHAS. E. SACKETT.

Witnesses:
THOS. D. TORNEY,
WILLIAM DOWNS.